United States Patent
Maurer et al.

(10) Patent No.: US 10,301,468 B2
(45) Date of Patent: May 28, 2019

(54) THERMALLY CONDUCTIVE AND ELECTRICALLY CONDUCTIVE NYLON COMPOUNDS

(71) Applicant: PolyOne Corporation, Avon Lake, OH (US)

(72) Inventors: Renaud Maurer, Pernand-Vergelesses (FR); Carlos Albas Giral, Barbastro (ES); Marc Mezailles, Brignais (FR)

(73) Assignee: PolyOne Corporation, Avon Lake, OH (US)

( * ) Notice: Subject to any disclaimer, the term of this patent is extended or adjusted under 35 U.S.C. 154(b) by 59 days.

(21) Appl. No.: 15/319,649

(22) PCT Filed: Jun. 18, 2015

(86) PCT No.: PCT/US2015/036493
§ 371 (c)(1),
(2) Date: Dec. 16, 2016

(87) PCT Pub. No.: WO2015/195956
PCT Pub. Date: Dec. 23, 2015

(65) Prior Publication Data
US 2017/0226341 A1    Aug. 10, 2017

Related U.S. Application Data

(60) Provisional application No. 62/014,624, filed on Jun. 19, 2014, provisional application No. 62/015,692, filed on Jun. 23, 2014.

(51) Int. Cl.
| | |
|---|---|
| *H01B 1/24* | (2006.01) |
| *C08K 7/14* | (2006.01) |
| *C08L 77/06* | (2006.01) |
| *C08K 3/04* | (2006.01) |
| *C08J 5/04* | (2006.01) |
| *C08K 5/00* | (2006.01) |
| *C08K 5/098* | (2006.01) |
| *C08K 9/06* | (2006.01) |
| *C08L 77/02* | (2006.01) |
| *C09K 5/14* | (2006.01) |
| *H01B 1/04* | (2006.01) |
| *B29B 9/14* | (2006.01) |
| *B29K 77/00* | (2006.01) |
| *B29K 309/08* | (2006.01) |

(52) U.S. Cl.
CPC .............. *C08L 77/06* (2013.01); *C08J 5/043* (2013.01); *C08K 3/04* (2013.01); *C08K 5/005* (2013.01); *C08K 5/098* (2013.01); *C08K 7/14* (2013.01); *C08K 9/06* (2013.01); *C08L 77/02* (2013.01); *C09K 5/14* (2013.01); *H01B 1/04* (2013.01); *B29B 9/14* (2013.01); *B29K 2077/00* (2013.01); *B29K 2309/08* (2013.01); *B29K 2995/0005* (2013.01); *B29K 2995/0013* (2013.01); *C08K 2201/004* (2013.01); *C08L 2201/08* (2013.01); *C08L 2205/02* (2013.01)

(58) Field of Classification Search
CPC ... H01B 1/24; H01B 1/04; H01B 1/12; C08K 7/14; C08K 7/02; C08K 7/04
See application file for complete search history.

(56) References Cited

U.S. PATENT DOCUMENTS

| | | | |
|---|---|---|---|
| 4,702,859 | A | 10/1987 | Shimizu et al. |
| 5,948,518 | A | 9/1999 | Lücke et al. |
| 6,048,919 | A | 4/2000 | McCullough |
| 6,251,978 | B1 | 6/2001 | McCullough |
| 6,545,081 | B1 | 4/2003 | Nishihata et al. |
| 6,600,633 | B2 | 7/2003 | Macpherson et al. |
| 7,476,702 | B2 | 1/2009 | Sagal et al. |
| 8,003,016 | B2 | 8/2011 | Mercx et al. |
| 8,524,120 | B2 | 9/2013 | Atkinson et al. |
| 8,552,101 | B2 | 10/2013 | I'Abee et al. |
| 8,638,027 | B2 | 1/2014 | Van Dijk et al. |
| 8,741,998 | B2 | 6/2014 | I'Abee et al. |
| 8,756,801 | B2 | 6/2014 | Nall et al. |
| 9,243,178 | B2 | 1/2016 | Chen et al. |
| 2006/0280938 | A1 | 12/2006 | Atkinson |
| 2008/0153959 | A1 | 6/2008 | Charati et al. |
| 2011/0206933 | A1 | 8/2011 | Kim et al. |

FOREIGN PATENT DOCUMENTS

| | | |
|---|---|---|
| CN | 102634171 A | 8/2012 |
| CN | 103044900 A | 4/2013 |
| JP | S6026057 A | 2/1985 |
| JP | 2010265381 A | 11/2010 |

OTHER PUBLICATIONS

A Study on Blends of Nylon-6 and Nylon-66, Verma et al, Journal of Applied Polymer Science, vol. 31, 747-762 (1986).*

* cited by examiner

*Primary Examiner* — Haidung D Nguyen
(74) *Attorney, Agent, or Firm* — Michael J. Sambrook; Maria M. Hoke

(57) ABSTRACT

A nylon compound is disclosed having good through plane thermal conductivity and improved physical strength. The compound comprises a combination of nylon, graphite, and long glass fibers. The through plane thermal conductivity of the compound ranges from about 1 W/m·K to about 4 W/m·K, as measured by the C-Therm Test described herein. This nylon compound is also electrically conductive, preferably having a surface resistivity ranging from about $1 \times 10^3$ Ohm/sq to about $1 \times 10^5$ Ohm/sq as measured by IEC 60093.

14 Claims, No Drawings

THERMALLY CONDUCTIVE AND ELECTRICALLY CONDUCTIVE NYLON COMPOUNDS

CLAIM OF PRIORITY

This application claims priority from U.S. Provisional Patent Application Ser. No. 62/014,624 filed on Jun. 19, 2014 and U.S. Provisional Patent Application Ser. No. 62/015,692 filed on Jun. 23, 2014, which are incorporated by reference.

FIELD OF THE INVENTION

This invention concerns thermally and electrically conductive nylon compounds with improved physical properties.

BACKGROUND OF THE INVENTION

Any energized product in modern society is not ideally efficient. Therefore, the consumption of energy is accompanied by the emission of heat. Dissipation of heat from an energized product is a common industrial engineering consideration. Electronic products are particularly susceptible to excessive heat. Personal computers contain fans for keeping sensitive electronic parts at or near the ambient temperature by dissipating the heat by convection.

Thermally conductive polymer compounds also exist to dissipate heat by conduction. These compounds are formed into parts to serve as heat sinks, radiators, etc. and other items more traditionally made of metal. Often graphite is used as an additive to a thermoplastic polymer matrix to serve as the vehicle for dissipation of heat. But graphite degrades the physical properties of the compound, including reducing the physical strength of the compound.

SUMMARY OF THE INVENTION

What the art needs is a polyamide compound which has higher thermal conductivity and improved impact strength. Desirably, the compound is also electrically conductive.

The present invention has solved that problem by using long glass fibers in combination with graphite. Thus, one aspect of the invention is a thermally conductive nylon compound, comprising polyamide resin, long glass fibers, graphite, optionally calcium stearate, and optionally heat stabilizer. The compound when molded into an article of 4 mm thickness has a through plane thermal conductivity ranging from about 1 W/m·K to about 4 W/m·K measured by the C-Therm Test described in the Internal Test Method section. Furthermore, the through plane thermal conductivity of the compound when molded is higher than a compound where long glass fibers are replaced with short glass fibers. In addition, the compound when molded into an article has a surface resistivity of less than about $1 \times 10^5$ Ohm/sq as measured by IEC 60093.

Another aspect of the invention is an electrically conductive nylon compound, comprising polyamide resin, long glass fibers, graphite, optionally calcium stearate, and optionally heat stabilizer, where the weight percent of graphite in the compound is 35 or less. The compound when molded into an article of 4 mm thickness has a through plane thermal conductivity ranging from about 1 W/m·K to about 4 W/m·K measured by the C-Therm Test. In addition, the compound when molded into an article has a surface resistivity of less than about $1 \times 10^5$ Ohm/sq as measured by IEC 60093. Furthermore, the surface resistivity of the compound when molded is more electrically conductive than a compound where long glass fibers are replaced with short glass fibers.

Another aspect of the invention is a method of making a thermally conductive nylon compound, comprising the steps of (a) gathering ingredients including polyamide resin, long glass fiber and graphite, (b) melt-mixing the polyamide resin and the graphite to form a polymer melt, (c) pultruding the long glass fiber from a roving through the polymer melt to form a compound, and (d) pelletizing the compound to form fiber reinforced pellets, where the length of the long glass fiber is substantially the length of the pellet. Features of the invention will be explored below.

EMBODIMENTS OF THE INVENTION

Nylon Polymer Matrix

Any polyamide or blends of polyamides (also referred to as "nylon") are candidates for use in the compound, whether obtained from petrochemical or bio-derived sources. Suitable polyamides include both amorphous and semi-crystalline polyamides, aliphatic and aromatic polyamides.

Non-limiting examples of polyamides (PA) which are candidates to serve as the matrix for the compound of the present invention include; nylon 11; nylon 12; nylon 4,6; nylon 10,10; nylon 12,12; copolyamides; and combinations thereof. Examples of aromatic polyamides include nylon 6; nylon 6,6; nylon 6I; nylon 6T; nylon 9T; nylon 10T; nylon 6I/66; nylon 6T/66; nylon 6I/6T; copolyamides; and combinations thereof. Preferred polyamides are nylon 6 and nylon 6,6 (also known as polyamide 6 and polyamide 6,6 respectively). Without undue experimentation, one of ordinary skill in the art can select a polyamide matrix based on considerations of cost, manufacturing technique, physical properties, chemical properties, etc. Preferred is a matrix of polyamide resin having polyamide 6,6 and polyamide 6 in a weight ratio in a range of about 1:1 to about 4:1.

Long Glass Fiber

Glass fibers are well known and useful fillers because they can provide physical reinforcement to a polymer compound to increase impact strength. In the present invention, long glass fibers have been discovered as being useful for the purpose of also increasing thermal conductivity. Additionally, long glass fibers have been found to increase electrical conductivity. This result is counter-intuitive because glass is electrically insulative.

Long glass fibers, as defined herein, are a collection of continuous glass filaments assembled as glass roving that is introduced unbroken into equipment, such as pultrusion equipment, to be associated with a polymer resinous matrix via spreading of the filaments from the roving during processing to become a polymer compound.

During processing, minimal breakage of long glass fibers results in a polymer compound that contains fibers having an average length substantially the length of the pellet. Pellets can be cut at any length, preferably ranging from about 6 mm to about 25 mm. Therefore, in the present invention, the average length of the long glass fiber in the polymer compound preferably ranges from about 6 mm to about 25 mm.

Long glass fibers are commercially available from a number of manufacturers, including the TUFROV® Long Fiber Thermoplastic brand glass roving from PPG and the StarRov® LFT$^{Plus}$ brand glass roving from Johns Manville.

Graphite

The mineral graphite is a crystalline form of carbon. Under standard conditions, graphite is the most stable form of carbon. Graphite can conduct electricity, but is also often used as a thermal conductor because of its planar morphology and high aspect ratio of length or width to depth. It is, consequently, useful in many electrical applications and also thermal applications. Graphite having about 95% to about 99.5% carbon content in the form of a powder with a median particle size of between about 70 μm to about 315 μm is preferred.

Graphite powder is commercially available from many suppliers, including Edelgraphit GmbH, Superior Graphite Company, Grafitbergbau Kaiserberg, Qingdao Haida Graphite Co., and Heilongjiang Aoyu Graphite Group.

Optional Metal Soaps

Metal soaps are compounds of long-chain fatty acids with metals of different valences. The primary metal soaps used in industry are based on calcium, zinc, magnesium and aluminum. These metal soaps are useful as acid scavengers as well as internal and external lubricants and mold-release agents. They improve the rheology, reduce friction during the extrusion process and optimize the surface quality of the final product. Metal soaps preferred for the invention are calcium stearates, such as Ceasit™ AV from Barlocher GmbH.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com), can select from many different types of additives for inclusion into the compounds of the present invention.

Non-limiting examples of optional additives include adhesion promoters; biocides; antibacterials; fungicides; mildewcides; anti-fogging agents; anti-static agents; bonding, blowing agents; foaming agents; dispersants; fillers; extenders; fire retardants; flame retardants; smoke suppressants; impact modifiers; initiators; lubricants; micas; pigments, colorants and dyes; plasticizers; processing aids; release agents; silanes, titanates and zirconates; slip agents; anti-blocking agents; stabilizers; stearates; ultraviolet light absorbers; viscosity regulators; waxes; and combinations of them.

Ingredients

Table 1 shows acceptable, desirable, and preferable ranges of ingredients useful in the present invention, all expressed in weight percent (wt. %) of the entire compound. The compound can comprise, consist essentially of, or consist of these ingredients. Any number between the ends of the ranges is also contemplated as an end of a range, such that all possible combinations are contemplated within the possibilities of Table 1 as candidate compounds for use in this invention.

TABLE 1

| Ingredients | Acceptable | Desirable | Preferable |
| --- | --- | --- | --- |
| Graphite | 20-50 | 25-45 | 30-35 |
| Long Glass Fiber | 10-40 | 20-30 | 20-25 |
| Polyamide resin | 10-70 | 10-60 | 20-50 |
| Heat Stabilizer | 0-1 | 0-0.7 | 0.1-0.4 |
| Optional Metal Soaps | 0-1 | 0-0.7 | 0.1-0.4 |
| Optional additives | 0-20 | 0-10 | 0-10 |

Processing

Materials having a continuous length (e.g. fibers, filaments, cables, cords, lines or wires) can be incorporated into thermoplastic resins through pultrusion. In this process, the polymer melt matrix is typically prepared using traditional extrusion methods where the ingredients are introduced at the throat of the extruder and are pushed by screw rotation through the melt mixing chamber of multiple heated zones to thoroughly mix them. The polymer melt then flows from the melt mixing chamber to an impregnation box positioned downstream where the polymer melt coats a fiber material that is pulled through the impregnation box. The fiber material is generally pulled along one axis and the polymer melt is delivered to a specific location using a cross head extrusion die along that axis. As the compound emerges from the impregnation box, it is typically cooled in a wet bath and then pelletized.

The pultrusion process yields continuous lengths of reinforced, thermoplastic compound having a high unidirectional orientation of the fiber reinforcing material with lengths of fibers equaling nearly the length of the pellet itself. Though breakage of the filaments during spreading of the roving is possible, the distribution curve of long glass fiber lengths is significantly oriented toward the length of the pellet itself. Thus, it can be stated as a first approximation that the average length of long glass fibers in the pellet is substantially the length of the pellet itself. Pellets can be cut at any length, preferably ranging from about 6 mm to about 25 mm. Therefore, in the present invention, the average length of the long glass fibers in the polymer compound is preferably from about 6 mm to about 25 mm.

In contrast, short glass fibers, as defined herein, are commercially available in the form of chopped glass fiber segments about 4 mm in length or less, and are typically processed into polymer compounds by an extrusion process. Because of the rotational shear stress applied during extrusion to incorporate the short glass fibers into the polymer matrix, the short glass fibers are broken into even smaller pieces, resulting in lengths of about 0.4 mm or even smaller in the final polymer compound.

Subsequent extrusion or molding techniques for the nylon compounds of the present invention, including extrusion, injection molding and compression molding, are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

USEFULNESS OF THE INVENTION

The physical properties of the polymer compound of the present invention can be determined through the use of graphite to impart thermal conductivity and long glass fibers to impart both reinforcement and, surprisingly, increased thermal conductivity. Because the compounds of the present invention can dissipate heat quite efficiently, they are suitable for molded or extruded articles, which are designed to contact a heated object and conduct heat away from that object, or contact a heated object and conduct heat toward a second object that needs heat also. Either way, the compounds of the present invention can transport heat away from the source, whether to distribute to a remote location from that object (a radiator in a residential room) or to dissipate to a remote location from that object (a heat sink).

Thermal management solutions are required for thermoplastics used in several applications for the electronics, appliance, medical and automotive industries. For example management and dissipation of heat is needed in the lighting industry, especially lighting produced by light emitting diodes (LEDs) as opposed to filamented electrical lamps. LEDs are sensitive in performance in the presence of temperature, as are the electronics nearby or contiguous to a lighted LED. Therefore, a preferred molded article is a LED housing.

In addition, thermal management solutions are needed for components of electronic articles such as consumer electronic devices, include computers, laptops, and gaming equipment; aerospace and automotive cooling systems; motor and battery housings; communication equipment housings; temperature sensors; and heat exchangers.

The compounds of the present invention are also electrically conductive materials formulated to have a surface resistivity of less than about $1 \times 10^5$ Ohm/sq as measured by IEC 60093. Electrically conductive materials are desirable for applications in which there is a risk of generating a spark that can ignite flammable chemicals or damage electronic components (e.g. atmospheres explosibles ("ATEX") applications). Unexpectedly, all of the Examples have electrically conductive properties in spite of the presence of electrically insulative long glass fibers. Therefore, preferably, surface resistivity for compounds of the invention can range from about $1 \times 10^3$ Ohm/sq to about $1 \times 10^5$ Ohm/sq as measured by IEC 60093.

Examples provide data for evaluation of the unpredictability of this invention.

EXAMPLES

Table 2 shows the list of ingredients and Table 3 shows the recipes for the Examples and Comparative Examples.

TABLE 2

| Brand Name | Ingredient and Purpose | Commercial Source |
|---|---|---|
| Edelgraphit NFL98 | Graphite | Edelgraphit GmbH |
| Tufrov ® 4510 (Silane sized) | Long Glass Fiber Roving (Average Fiber Diameter = 17 µm) | PPG Industries |
| Thermoflow ® 672 | Short Glass Fiber 4 mm in length before breakage during processing | Johns Manville |
| Zytel ® FE210021 NC010 | Polyamide 6,6 | DuPont |
| Alphalon ™ 27C | Polyamide 6 | ATT Polymers GmbH |
| Brüggolen ® H 160 | heat stabilizer and antioxidant mixture of phenolic antioxidants and synergists | L. Brüggemann KG |
| Ceasit ™ AV | Calcium Stearate | Bärlocher GmbH |

TABLE 3

Recipes for Comparative Examples and Examples

| | Example 1 | Example A | Example 2 | Example B | Example 3 | Example C | Example 4 | Example D |
|---|---|---|---|---|---|---|---|---|
| Formula | LGF | SGF | LGF | SGF | LGF | SGF | LGF | SGF |
| Graphite | 24.88% | 25.00% | 29.85% | 30.00% | 34.83% | 35.00% | 39.80% | 40.00% |
| Long Glass Fiber | 24.88% | | 24.88% | | 24.88% | | 24.88% | |
| Short Glass fiber | | 25.00% | | 25.00% | | 25.00% | | 25.00% |
| PA6,6 | 39.10% | 39.50% | 31.94% | 33.00% | 24.88% | 26.00% | 17.81% | 17.50% |
| PA6 | 10.65% | 10.00% | 12.84% | 11.50% | 14.93% | 13.50% | 17.01% | 17.00% |
| Heat stabilizer | 0.30% | 0.30% | 0.30% | 0.30% | 0.30% | 0.30% | 0.30% | 0.30% |
| Calcium stearate | 0.20% | 0.20% | 0.20% | 0.20% | 0.20% | 0.20% | 0.20% | 0.20% |
| | 100% | 100% | 100% | 100% | 100% | 100% | 100% | 100% |

Table 4a provides the mixing conditions for the Comparative Examples and Table 4b provides the mixing conditions for the Examples. The Comparative Examples and Examples were processed using a counter-rotating twin screw extruder, one configuration for twin screw extrusion and a second configuration adding an impregnation box for pultrusion, respectively. All of the ingredients for the Comparative Examples and the Examples were fed through the extruder's main hopper at the throat, except that the long glass fibers for the Examples were added to the polymer melt following the extrusion process via an attached pultrusion line described further below. The graphite was added in the form of a powder for the Comparative Examples and in the form of a graphite masterbatch for the Examples. The composition of the graphite masterbatch was nylon 6 (29.4%), graphite (70%), heat stabilizer (0.3%) and calcium stearate (0.3%). Although the graphite was added in different forms, it was determined to not materially affect the resulting compounds.

To process the long glass fiber material for the Examples, a pultrusion line configuration was attached to the extruder. The polymer melt matrix was prepared by adding all of the ingredients, excluding the long glass fibers, into the extruder's main hopper for mixing through multiple heated zones in the twin screw extruder. The polymer melt then flowed from the extruder into an impregnation box, which was positioned on the pultrusion line downstream from the extruder. The polymer melt coated the long glass fibers that were pulled as continuous roving filaments along a single axis through the impregnation box. The compound emerging from the impregnation box was cooled in a wet bath and pelletized for later injection molding into pellets having a length of 12 mm.

TABLE 4a

Mixing Conditions
All Comparative Examples

| | |
|---|---|
| Extruder Type | Coperion twin screw (co-rotating) extruder (26 mm) |
| Order of Addition | All ingredients were mixed together and fed into the extruder's main hopper for twin screw agitating rotation through the 8 zones at progressively higher temperatures. |
| Zone 1 | 290° C. |
| Zone 2 | 300° C. |
| Zone 3 | 310° C. |
| Zone 4 | 320° C. |
| Zone 5 | 325° C. |
| Zone 6 | 330° C. |
| Zone 7 | 335° C. |
| Zone 8 | 340° C. |
| Die | 340° C. |
| RPM | 350 rpm |
| Pellet Size | 6 mm |

TABLE 4b

Mixing Conditions
All Examples

| | |
|---|---|
| Extruder Type | Coperion twin screw (co-rotating) extruder (50 mm) set up as a pultrusion line |
| Order of Addition | All ingredients were mixed together and fed into the extruder's main hopper for preparation of the polymer melt, except the long glass fiber which was added as a glass roving through the impregnation box for spreading and impregnating by the polymer melt. |
| Zone 1 | 290° C. |
| Zone 2 | 300° C. |
| Zone 3 | 310° C. |
| Zone 4 | 320° C. |
| Zone 5 | 325° C. |
| Zone 6 | 330° C. |
| Zone 7 | 335° C. |
| Zone 8 | 340° C. |
| Die | Impregnation box (345° C.) |
| RPM | 350 rpm |
| Pellet Size | 12 mm |

As a result of the extrusion method used to incorporate short glass fibers into the Comparative Examples, there was significant breakage of the fibers into smaller pieces having a length of about 0.4 mm or less. This breakage was likely due, at least in part, to the rotational stress exerted on the short glass fibers from the extrusion process. On the other hand, as a result of being able to use a pultrusion process to incorporate long glass fibers into the Examples, there was minimal breakage, resulting in long glass fibers in the polymer compound having the length of about 12 mm.

Table 5 gives the molding conditions in an Arburg molding machine for both the Examples and the Comparative Examples.

TABLE 5

Molding Conditions
All Comparative Examples and Examples
Arburg molding machine

| Drying Conditions before Molding: | |
|---|---|
| Temperature (° C.) | 80° C. |
| Time (hours) | 4 |
| Temperatures: | |
| Nozzle (° C.) | 290 |
| Zone 1 (° C.) | 280 |
| Zone 2 (° C.) | 290 |
| Zone 3 (° C.) | 300 |
| Mold (° C.) | 110 |
| Speeds: | |
| Screw RPM (%) | 350 mm/s |
| % Shot - Inj Vel Stg 1 | 80 cm3/s |
| % Shot - Inj Vel Stg 2 | 80 cm3/s |
| % Shot - Inj Vel Stg 3 | 80 cm3/s |
| % Shot - Inj Vel Stg 4 | 80 cm3/s |
| % Shot - Inj Vel Stg 5 | 80 cm3/s |
| Pressures: | |
| Hold Stg 1 (mPa) - Time (sec) | 750 Bar |
| Hold Stg 2 (mPa) - Time (sec) | 750 Bar |
| Timers: | |
| Injection Hold (sec) | 5 |
| Cooling Time (sec) | 25 |
| Operation Settings: | |
| Shot Size (ccm) | 35 |
| Cushion (ccm) | 1.8 |

Once molded the sample shots from each Example and Comparative Example were tested for shrinkage, strength, thermal conductivity, impact resistance and surface resistivity. Table 6 describes the test methods used to obtain the test results for the Examples and Comparative Examples shown in Table 7.

TABLE 6

Test Methods

| | |
|---|---|
| ASH content | ISO 3451 |
| Specific gravity | ISO 1183 |
| Shrinkage % | ISO 294-4 |
| Tensile Strength Mpa | ISO 527 |
| Tensile Modulus Mpa | ISO 527 |
| Tensile elongation % | ISO 527 |
| Flexural Strength Mpa | ISO 178 |
| Flexural Modulus Mpa | ISO 178 |
| Thermal conductivity Through plane W/m.K | C-Therm Test (Internal method described below) |
| Notched charpy Impact kJ/m$^2$ | ISO-179/1eA |
| Unnotched charpy Impact kJ/m$^2$ | ISO-179/1eU |
| Surface resistivity (Ohm/sq) | IEC 60093 |
| Heat Deflection Temperature (HDT) (MPa) | ISO 75 method C |
| Unnotched charpy Impact kJ/m$^2$ (−30° C.) | ISO-179/1eU |

Internal Methods

Thermal conductivity can be represented in two ways: "through plane" and "in plane". For purposes of the examples the through plane thermal conductivity was measured by the modified transient plane source method using the C-Therm TCi™ Thermal Conductivity Analyzer (also referred to as the "C-Therm Test" defined for purposes of this disclosure and the claims).

The dimensions of the tensile bars for the C-Therm tests were 172 mm×10 mm×4 mm and the tensile bar type was ISO 527—Type 1A. Each example was run as a new test, selecting "Ceramics" as the test method from the C-Therm Test's standard options and using water as the contact agent.

The C-Therm test uses a one-sided, interfacial, heat reflectance sensor that applies a momentary, constant heat source to the sample. Both thermal conductivity and effusivity are measured directly to provide a detailed overview of the thermal characteristics of the sample material by applying a known current to the sensor's heating element providing a small amount of heat. The heat provided results in a rise in temperature at the interface between the sensor and the sample—typically less than 2° C. This temperature rise at the interface induces a change in the voltage drop of the sensor element. The rate of increase in the sensor voltage is used to determine the thermo-physical properties of the sample material.

The thermal conductivity is calculated based on the time rate of steady state heat flow through a unit area of the sample induced by a unit temperature gradient in a direction perpendicular to that unit area, W/m·K.

Table 7 shows the test method results for the Examples and Comparative Examples.

compared to the respective Comparative Examples, with Example 2 having a thermal conductivity 34% higher than Comparative Example B. It is noted that the content of graphite (ASH) was 4.22% greater for Comparative Example A than Example 1 in spite of the original starting materials seen in Table 3, which explains the slightly higher thermal conductivity compared to Example 1. Therefore, the slightly higher through plane thermal conductivity for Comparative Example A is discounted by that actually higher graphite content. Additionally, the heat deflection temperature increased by 12% or greater in Examples 1, 2 and 3 that were tested compared to the respective Comparative Examples.

Finally, the surface resistivity (Ohm/sq) of each of the Examples was electrically conductive, having a surface resistivity of less than about $1 \times 10^5$ Ohm/sq as measured by IEC 60093. Moreover, Examples 1, 2, and 3 were unexpectedly lower (i.e., more electrically conductive and less electrically insulative) compared to their respective Comparative Examples A-C. Indeed, Examples 1-3 are within the range of electrically conductive materials, whereas Comparative Examples are within the range of being electrically dissipative. Because glass is electrically insulative, it is counterintuitive that longer glass fibers would reduce surface resistivity, all other variables being constant.

Further comparison shows more unpredictable results in this combination of ingredients where long glass fiber has

TABLE 7

Test Results of Comparative Examples and Examples

| Properties | Example 1 | Example A | Example 2 | Example B | Example 3 | Example C | Example 4 | Example D |
|---|---|---|---|---|---|---|---|---|
| ASH glass % | 23.4 | 25.1 | 25.04 | 24.8 | 26.18 | 25.3 | 26.03 | 24.9 |
| ASH graphite % | 19.28 | 23.5 | 28.13 | 29.5 | 33.92 | 33.9 | 37.01 | 39.2 |
| Specific gravity | 1.48 | 1.55 | 1.61 | 1.6 | 1.67 | 1.65 | 1.76 | 1.72 |
| Shrinkage % | 0.22 | 0.25 | 0.24 | 0.25 | 0.3 | 0.22 | 0.26 | 0.3 |
| Tensile Strength Mpa | 129 | 109 | 92.9 | 100 | 59.3 | 87 | 77 | 50 |
| Tensile Modulus Mpa | 14,700 | 17,640 | 15,790 | 18,900 | 14,740 | 17,102 | 16,940 | 18,470 |
| Tensile elongation % | 1.9 | 1 | 0.8 | 0.85 | 0.4 | 0.7 | 0.52 | 0.3 |
| Flexural Strength Mpa | 178 | 151 | 158 | 136 | 141 | 127 | 138 | 113 |
| Flexural Modulus Mpa | 12,100 | 11,600 | 12,640 | 12,320 | 13,180 | 13,362 | 15,750 | 14,675 |
| Thermal conductivity Through plane W/m · K | 1.1 | 1.21 | 1.92 | 1.43 | 2.27 | 1.98 | 3.4 | 3.11 |
| Notched Charpy Impact kJ/m$^2$ | 11 | 5.3 | 8.3 | 4.6 | 6.8 | 5.5 | 6.1 | 4.3 |
| Unnotched Charpy Impact kJ/m$^2$ | 45.2 | 22 | 29.5 | 16.6 | 18.5 | 14 | 13.2 | 11 |
| Surface resistivity (Ohm/sq) | 1.50E+03 | 2.00E+05 | 6.00E+04 | 2.00E+06 | 2.00E+04 | 1.80E+05 | 4.40E+04 | 1.00E+04 |
| Heat Deflection Temperature (MPa) | 225 | 194 | 213 | 187 | 202 | 190 | (Not tested) | 190 |
| Unnotched charpy Impact kJ/m$^2$ (−30° C.) | 38.9 | 19.6 | 25 | 17.7 | 20.5 | 13.2 | 17.7 | 10.2 |

The examples tested both short glass fibers (the Comparative Examples) and long glass fibers (the Examples) in thermally conductive and electrically conductive nylon compounds containing graphite. While both types of glass fibers increased the strength of the nylon compound, the Examples containing long glass fibers had higher impact strength and flexural strength compared to the Comparative Examples containing short glass fibers.

The thermal conductivity of the Examples had a through plane thermal conductivity ranging from about 1 W/m·K to about 4 W/m·K measured by C-Therm Test on molded samples having a thickness of 4 mm. Unpredictably, the thermal conductivity of Examples 2, 3 and 4 was also higher replaced short glass fiber in the comparison between Example 4 and Comparative Example D. Although, the advantage of thermal conductivity for Example 4 and Comparative Example D was consistent with Examples 1-3 vs. Comparative Examples A-C, the surprising advantage of less surface resistivity using longer glass fibers was lost because Comparative Example D had less surface resistivity than Example 4. While not being limited to a particular theory, it is believed that the weight percent loading of graphite above 35 weight percent contributed more to the electrical properties of the compound than did the glass fiber length.

Glass fibers are known for their ability to reinforce polymer matrices. In addition, short glass fibers and long glass fibers would be expected to contribute similarly to the properties of thermal conductivity, surface resistivity and heat deflection temperature in nylon compounds. Surprisingly, however, long glass fibers achieved superior characteristics for applications requiring thermal management (i.e. through plane thermal dissipation), increased heat deflection temperature, and electrical conductivity.

The invention is not limited to the above embodiments. The claims follow.

What is claimed is:

1. A thermally conductive nylon compound in the form of a pellet having a length, the compound consisting of:
   a. polyamide resin comprising polyamide 6,6 and polyamide 6 in a weight ratio in a range of about 1:1 to about 4:1;
   b. long glass fibers having an average length substantially the same as the length of the pellet and ranging from about 6 mm to about 25 mm, and wherein the long glass fibers are incorporated into the compound as continuous glass filaments;
   c. from about 20 to about 50 weight percent, by weight of the compound, of graphite powder;
   d. optionally, metal soap;
   e. optionally, heat stabilizer; and
   f. optionally, other additives selected from the group consisting of flame retardants; smoke suppressants; impact modifiers; pigments, colorants, and dyes; processing aids; and combinations of them;
   wherein the compound when molded into an article of 4 mm thickness has a through plane thermal conductivity ranging from about 1 W/m.K to about 4 W/m.K measured by C-Therm Test;
   wherein the through plane thermal conductivity of the compound when molded into article of 4 mm thickness and measured by C-Therm Test is higher than a through plane thermal conductivity of a comparative compound when molded into article of 4 mm thickness and measured by C-Therm Test, wherein the comparative compound is identical to the compound except that the long glass fibers are replaced with short glass fibers having an average length of about 4 mm or less; and
   wherein the compound when molded into an article has a surface resistivity of less than about $1\times10^5$ Ohm/sq as measured by IEC 60093.

2. The compound of claim 1, wherein the compound when molded into an article has a surface resistivity ranging from about $1\times10^3$ Ohm/sq to about $1\times10^5$ Ohm/sq as measured by IEC 60093.

3. An article made from the compound of claim 1, wherein the article is extruded or molded.

4. The article of claim 3 molded into a housing for a light emitting diode.

5. A method of making the compound of claim 1 in the form of the pellet, the method comprising the steps of:

(a) gathering the polyamide resin, the long glass fibers, the graphite powder, optionally the metal soap, optionally the heat stabilizer, and optionally the other additives;
   (b) melt-mixing the polyamide resin, the graphite powder, optionally the metal soap, optionally the heat stabilizer, and optionally the other additives, to form a polymer melt;
   (c) pultruding the long glass fibers through the polymer melt to form the compound; and
   (d) pelletizing the compound to form the pellet.

6. The method of claim 5, wherein the long glass fibers are pultruded from a roving.

7. The method of claim 5, wherein the compound is extruded or molded into an article.

8. A thermally conductive nylon compound in the form of a pellet having a length, the compound consisting of:
   (a) from about 10 to about 60 weight percent, by weight of the compound, of polyamide resin comprising polyamide 6,6 and polyamide 6 in a weight ratio in a range of about 1:1 to about 4:1;
   (b) from about 20 to about 30 weight percent, by weight of the compound, of long glass fibers having an average length substantially the same as the length of the pellet and ranging from about 6 mm to about 25 mm, and wherein the long glass fibers are incorporated into the compound as continuous glass filaments;
   (c) from about 25 to about 45 weight percent, by weight of the compound, of graphite powder;
   (d) from 0 to about 0.7 weight percent, by weight of the compound, of metal soap;
   (e) from 0 to about 0.7 weight percent, by weight of the compound, of heat stabilizer; and
   (f) from 0 to about 10 weight percent, by weight of the compound, of other additives selected from the group consisting of flame retardants; smoke suppressants; impact modifiers; pigments, colorants, and dyes; processing aids; and combinations of them.

9. The compound of claim 8, wherein the graphite powder has a median particle size from about 70 micrometers to about 315 micrometers.

10. The compound of claim 9, wherein the graphite powder has a carbon content from about 95% to about 99.5%.

11. An article made from the compound of claim 8, wherein the article is extruded or molded.

12. The article of claim 11 molded into a housing for a light emitting diode.

13. The compound of claim 1, wherein the graphite powder has a median particle size from about 70 micrometers to about 315 micrometers.

14. The compound of claim 13, wherein the graphite powder has a carbon content from about 95% to about 99.5%.

* * * * *